United States Patent
Meier (10) Patent No.: US 11,889,838 B2
(45) Date of Patent: Feb. 6, 2024

(54) DOUGH-PORTIONING APPARATUS

(71) Applicant: Werner & Pfleiderer Lebensmitteltechnik GmbH, Dinkelsbühl (DE)

(72) Inventor: Alexander Meier, Dürrwangen (DE)

(73) Assignee: Werner & Pfleiderer Lebensmitteltechnik GmbH, Dinkelsbühl (DE)

( * ) Notice: Subject to any disclaimer, the term of this patent is extended or adjusted under 35 U.S.C. 154(b) by 864 days.

(21) Appl. No.: 16/947,009

(22) Filed: Jul. 15, 2020

(65) Prior Publication Data

US 2021/0015110 A1 Jan. 21, 2021

(30) Foreign Application Priority Data

Jul. 17, 2019 (DE) .................. 20 2019 103 931.0

(51) Int. Cl.
*A21C 5/00* (2006.01)
*A21C 5/02* (2006.01)

(52) U.S. Cl.
CPC .................................... *A21C 5/02* (2013.01)

(58) Field of Classification Search
CPC .................................... A21C 5/04; A21C 5/02
See application file for complete search history.

(56) References Cited

U.S. PATENT DOCUMENTS

| | | | |
|---|---|---|---|
| 3,785,623 A | 1/1974 | Koenig | |
| 4,778,079 A | 10/1988 | Judex | |
| 5,211,968 A * | 5/1993 | Judex | A21C 5/02 425/238 |
| 5,775,804 A | 7/1998 | Meier | |
| 2009/0161477 A1 | 6/2009 | Meier et al. | |
| 2018/0084789 A1 | 3/2018 | Meier | |

FOREIGN PATENT DOCUMENTS

| | | |
|---|---|---|
| DE | 2244469 A1 | 3/1973 |
| DE | 19640176 A1 | 4/1998 |
| DE | 102013221230 A1 | 4/2015 |
| EP | 0213582 B1 | 7/1990 |

(Continued)

*Primary Examiner* — Anshu Bhatia (74) *Attorney, Agent, or Firm* — Smartpat PLC (57) ABSTRACT

A multi-row dough-portioning apparatus has a chamber housing having a number of portioning chambers for pre-determining a portioned quantity of dough. Measuring pistons can each be displaced in the portioning chambers along a displacement direction between a retracted, measuring position and a pushed-out, ejecting position. A rotation-prevention bar is installed in a releasable manner on a rear wall of the chamber housing and interacts with a circumferential recess in the measuring pistons in order to prevent rotation of the same. The chamber housing has a projecting section, which projects beyond the rear housing wall. The rotation-prevention bar is installed on the chamber housing such that, upon release, it can be removed from the chamber housing in a removal direction perpendicular to the displacement direction of the measuring pistons. This results in a dough-portioning apparatus which, even in the case of large-volume portioning chambers, is easy to maintain and clean.

8 Claims, 7 Drawing Sheets

(56) References Cited

FOREIGN PATENT DOCUMENTS

| | | |
|---|---|---|
| EP | 0494367 B1 | 3/1995 |
| EP | 0643914 B1 | 1/1999 |
| EP | 2071955 B1 | 1/2013 |
| EP | 2353390 B1 | 1/2019 |
| EP | 3298900 B1 | 11/2019 |
| GB | 659147 A | 10/1951 |
| JP | S5756486 A | 4/1982 |

* cited by examiner

DOUGH-PORTIONING APPARATUS

CROSS-REFERENCES TO RELATED APPLICATIONS

This application claims the priority of German Utility Model, Serial No. 20 2019 103 931.0, filed Jul. 17, 2019, the content of which is included herein by reference in its entirety as if fully set forth herein.

TECHNICAL FIELD

The disclosure relates to an, in particular, multi-row dough-portioning apparatus having at least one portioning chamber for predetermining a portioned quantity of dough and having at least one measuring piston, which can be displaced in the portioning chamber.

BACKGROUND

Dough-portioning apparatuses are known from DE 10 2013 221 230 A1, from EP 2 071 955 B1, from EP 3 298 900 A, from DE 196 40 176 A1 and from EP 0 643 914 A1. GB 659,147 describes a dough divider. U.S. Pat. No. 3,785,623 describes a dough-portioning machine.

SUMMARY

It is an object of the present disclosure to develop a dough-portioning apparatus such that, in particular even in the case of large-volume portioning chambers, it is easy to maintain and clean.

This object is achieved by a multi-row dough-portioning apparatus—having a chamber housing,
  having a number of portioning chambers for predetermining a portioned quantity of dough,
  having a number of measuring pistons, which can each be displaced in the portioning chambers along a displacement direction
    between a retracted, measuring position, in which the respective measuring piston in the respective portioning chamber predetermines a predetermined portioning volume,
    and a pushed-out, ejecting position,
  having a rotation-prevention bar, which is installed in a releasable manner on a rear wall of the chamber housing and interacts with a circumferential recess in the measuring pistons in order to prevent rotation of the measuring pistons,
  wherein the chamber housing has a projecting section, which projects beyond the rear housing wall,
    wherein the rotation-prevention bar is installed on the chamber housing such that, upon release, it can be removed from the chamber housing in a removal direction perpendicular to the displacement direction of the measuring pistons.

It has been found that a rotation-prevention bar which can be removed from the chamber housing in a direction perpendicular to the displacement direction of the measuring pistons makes it possible for the rotation-prevention bar to be installed on the chamber housing without any tools being required and, correspondingly, also to be removed from the chamber housing without any tools being required. This avoids problems which are associated with necessarily tool-based installation of the rotation-prevention bar. In order for the dough-portioning apparatus to be maintained and/or cleaned, the rotation-prevention bar can be removed from the in particular pivotable chamber housing in a direction perpendicular to the displacement direction of the measuring pistons. The removal direction is directed away from the projecting section of the chamber housing, and therefore said projecting section does not constitute an obstruction. Correspondingly, it is also possible for a circumferential section via which the measuring pistons interact with the rotation-prevention bar in order to prevent rotation to be directed away from the projecting section. A diameter of the portioning chamber and/or a shaft height of a housing of a portioning module can be greater than 50 mm and can be, for example, 65 mm.

In the case of a locking unit, in which the rotation-prevention bar is installed on the chamber housing via at least one locking unit which can be actuated without any tools being required, the advantages relating to the fitting of the rotation-prevention bar are realized to particularly good effect.

This applies correspondingly to embodiments of the locking units having a housing-mounted bolt, which engages in a recess in the rotation-prevention bar, and in which that the bolt is designed in the form of a spring bolt, which is prestressed into a locking position.

A portioning cylinder, in which the chamber housing is designed in the form of part of a portioning cylinder, which can be pivoted
  between a measuring-specific pivoting position, in which the measuring piston (8), in the measuring position, predetermines the predetermined portioning volume,
  and a pivoted ejecting-specific pivoting position, in which the measuring piston (8) can be displaced into the ejecting position in order to transfer a portion of dough to a downstream processing unit,
has proven to be particularly suitable.

By means of a measuring unit, in which at least one section of the respective portioning chamber is bounded by a measuring unit, which is installed on a main body of the chamber housing, for example a length of the portioning chambers can be predetermined, in particular in an adjustable manner, by displacement of the measuring unit relative to the main body.

A recessed arrangement of installation elements, in which the measuring unit is in alignment with the rear housing wall, wherein installation elements for installing the measuring unit on the main body are arranged in a recessed manner in the measuring unit, for installing the measuring unit on the main body ensures that the installation elements do not obstruct the removal of the rotation-prevention bar.

The advantages of the dough-portioning apparatus having the rotation-prevention bar, which can be removed in a direction perpendicular to the displacement direction of the measuring pistons, are realized particularly in the case of a multi-row embodiment with a corresponding number of portioning chambers and measuring pistons.

The advantages of a dough-processing installation having a dough-portioning apparatus correspond to those which have already been explained above in conjunction with the dough-portioning apparatus.

Exemplary embodiments of the invention will be explained in more detail hereinbelow with reference to the drawings.

DETAILED DESCRIPTION

A dough-processing installation, of which the drawing illustrates a portioning module 1 of a dough-portioning apparatus, in the embodiment illustrated a six-row dough-portioning apparatus, serves to portion and to work dough, e.g. in the production of bread rolls. Corresponding processing installations are known from DE 10 2013 221 230 A1, EP 2 071 955 B1, EP 3 298 900 A, DE 196 40 176 A1 and EP 0 643 914 A1.

Figure 1:
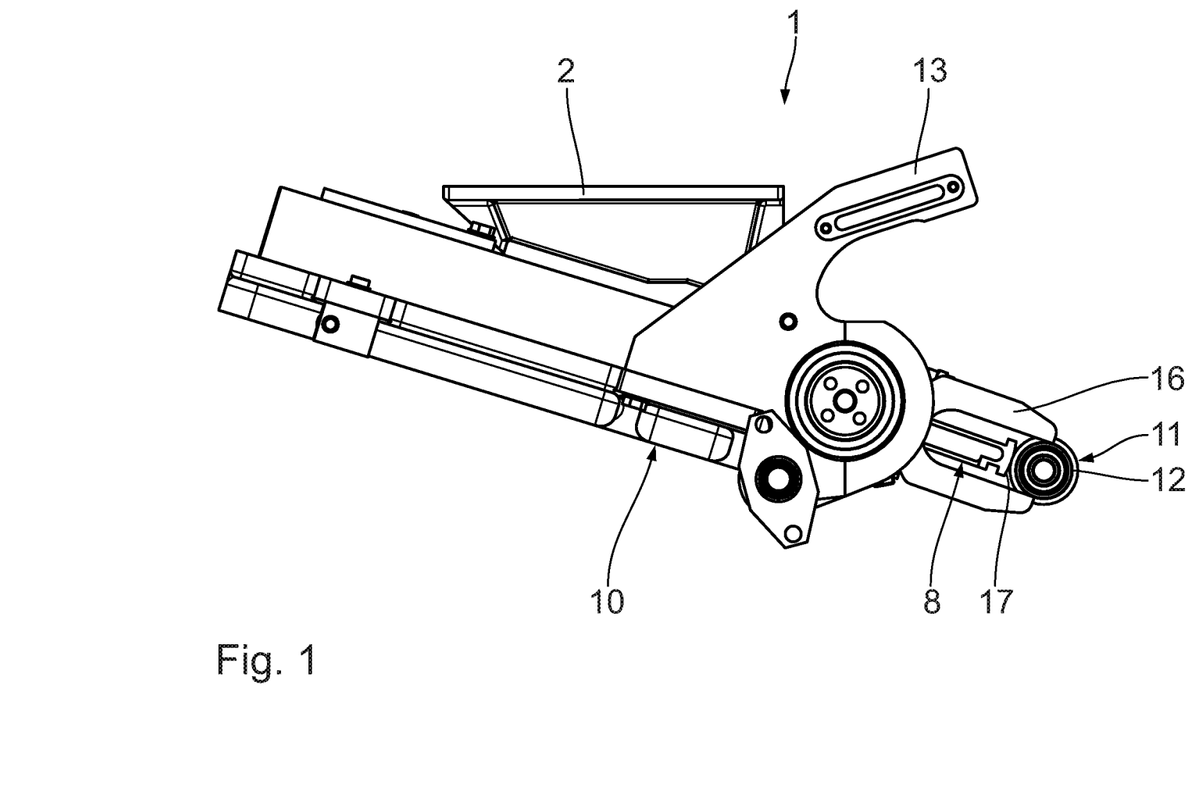
FIG. 1 shows a side view of a portioning module of a multi-row dough-portioning apparatus.

Dough (not illustrated) can be introduced into a feed hopper 2 (cf., for example, FIG. 1). An exit opening 3 (cf. FIG. 2) on the base of the feed hopper 2 is in connection with a delivery space 4, which contains a delivery piston (not illustrated in the drawing). Together with the feed hopper 2, the delivery piston constitutes a dough-feeding device of the dough-processing installation.

Figure 2:
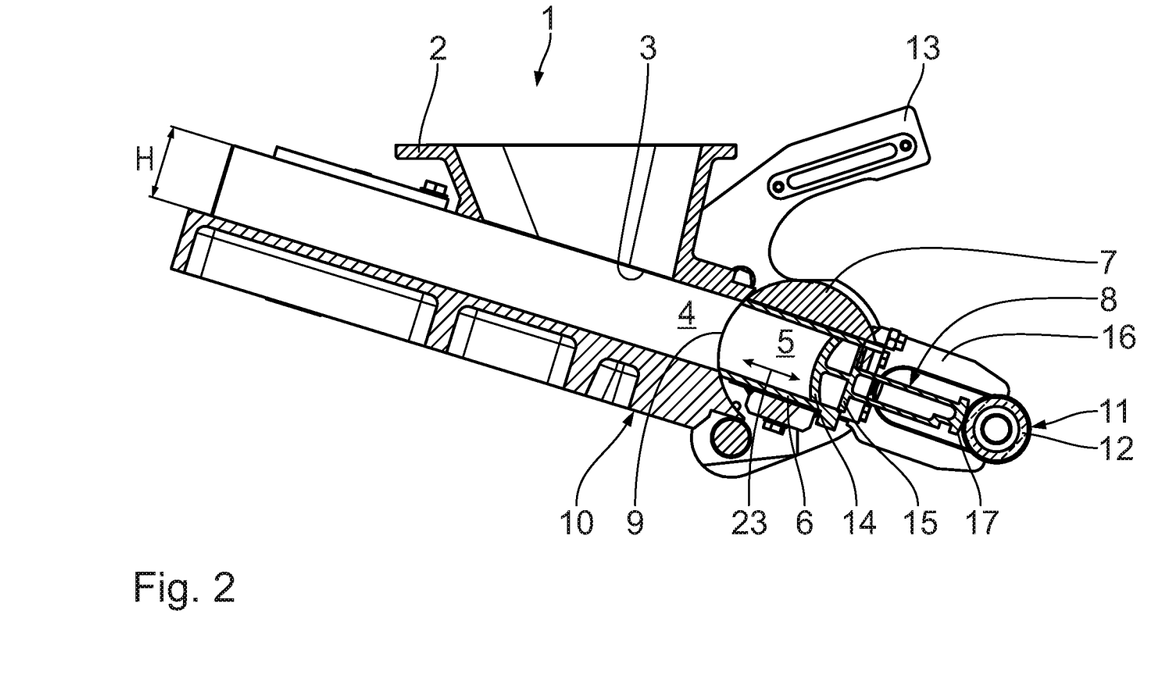
FIG. 2 shows a section through the portioning module in a plane of one of the portioning chambers of the portioning module.
Figure 3:
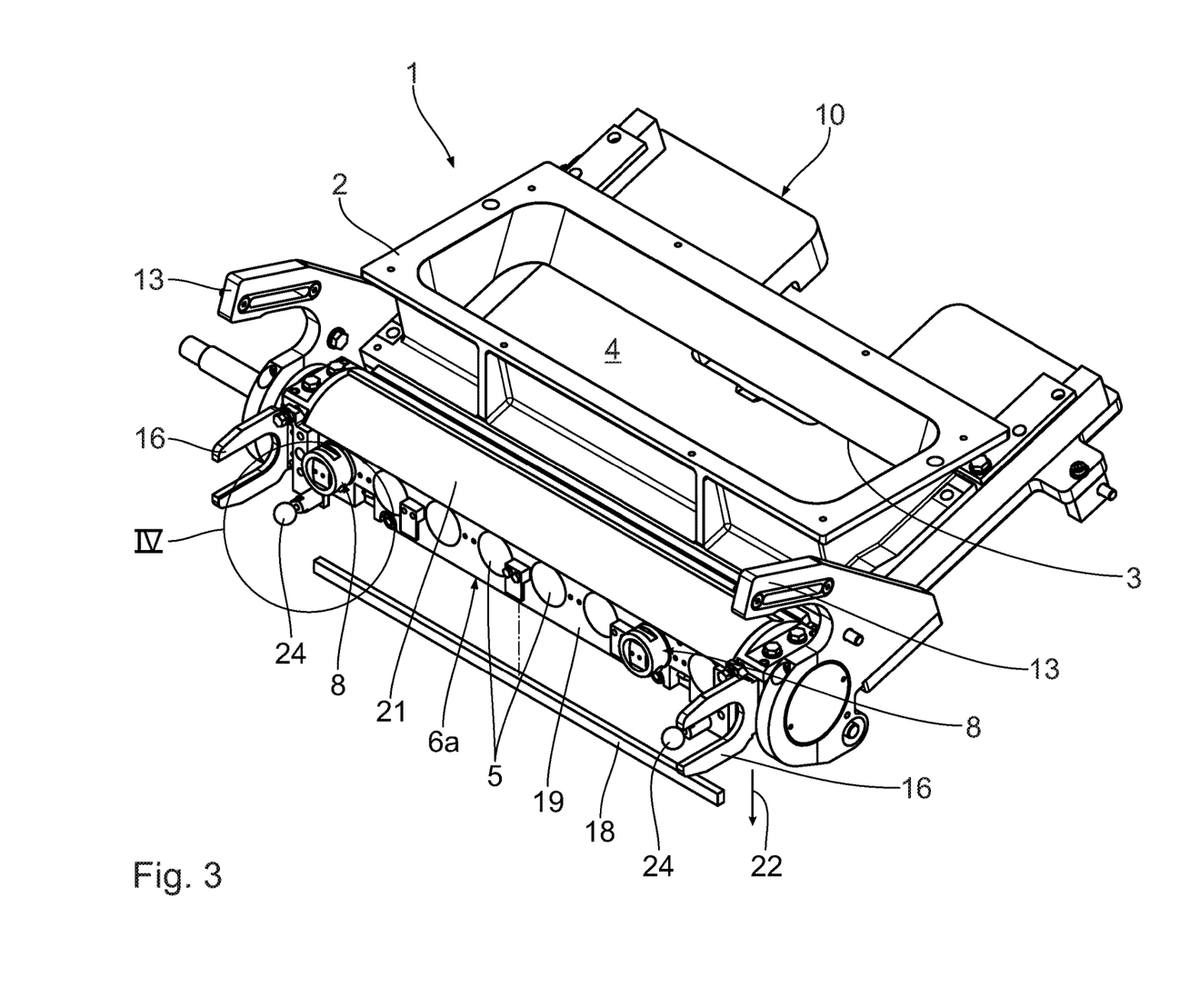
FIG. 3 shows a perspective view of the portioning module as seen obliquely from above, wherein a rotation-prevention bar is shown in a removed state, that is to say in a position in which it has been removed in a removal direction perpendicular to a displacement direction of measuring pistons of the portioning module, by way of example two of a total of six possible measuring pistons being illustrated.
Figure 4:
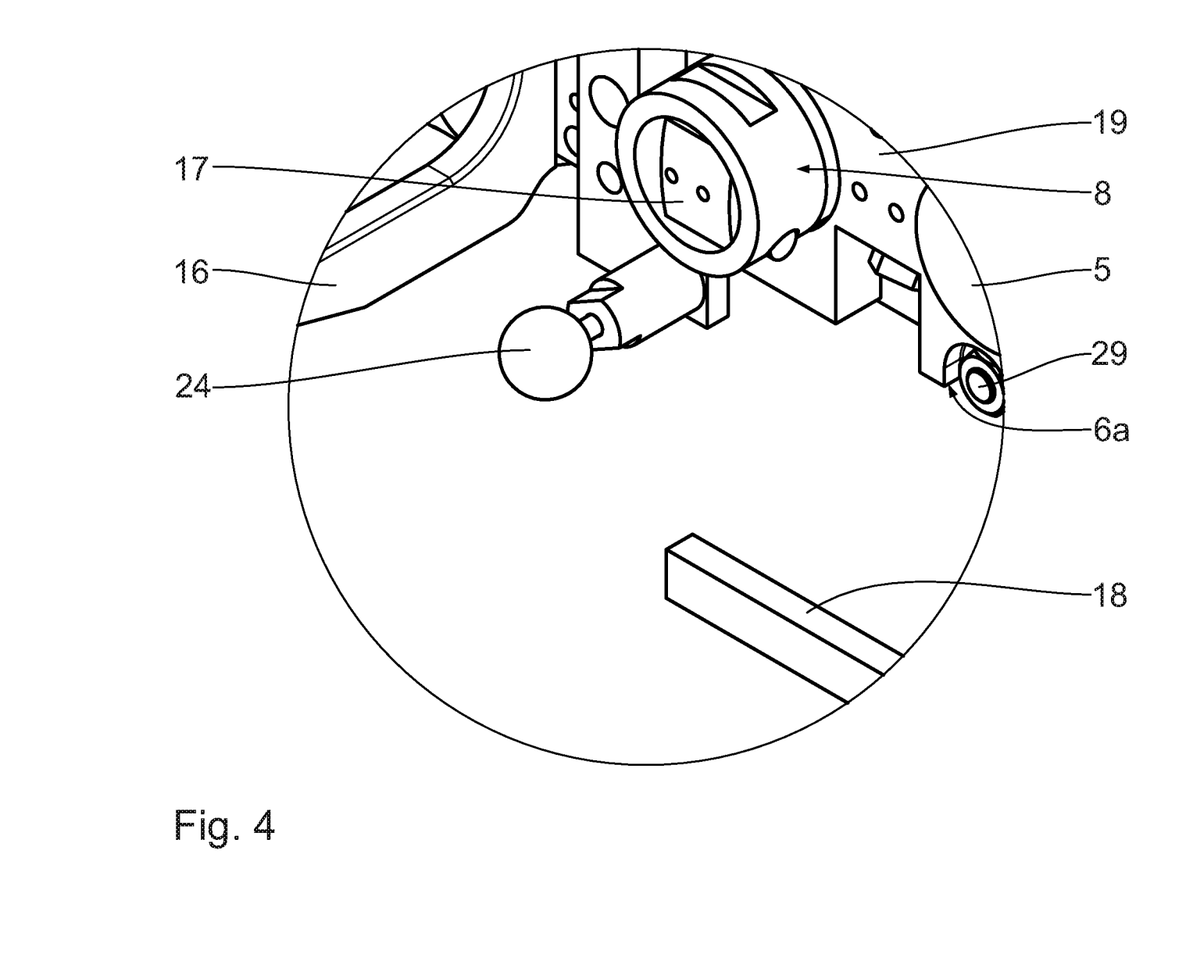
FIG. 4 shows the detail IV in FIG. 3.

The dough-processing installation is of overall multi-row design and has a corresponding number of portioning chambers 5 for predetermining in each case a portioned quantity of dough. In the case of the embodiment illustrated, a total of six such portioning chambers 5 are arranged one beside the other in a direction perpendicular to the drawing plane for example of FIGS. 1 and 2. A diameter of the portioning chambers 5 and/or a shaft height H of the delivery space 4 is greater than 50 mm and can be, for example, 65 mm. Lateral walls 6 of the portioning chambers 5 are formed in a pivotable chamber housing 6a of a portioning cylinder 7 which, driven via a pivoting drive (not illustrated specifically), can be pivoted about a pivot axis arranged in a direction perpendicular to the drawing plane of FIGS. 1 and 2. The portioning cylinder 7 is also referred to as a rotary slide. In FIGS. 1 and 3, the portioning cylinder 7 is in a measuring-specific pivoting position, in which the portioning chambers 5 are in alignment with the delivery space 4 and are in dough-delivering connection therewith.

A respective measuring piston 8 is arranged in the portioning chambers 5. The respective measuring piston 8 has an oval cross section. As an alternative, it is also possible for the cross section of the measuring piston to be round. The respective measuring piston 8 can be displaced, in the portioning chamber 5 assigned to it, between a retracted, measuring position, which is illustrated in FIG. 2, and a pushed-out, ejecting position. In the ejecting position, an end-side surface of the respective measuring piston 8 is in alignment with a pivoting guide wall 9, which at the same time forms a transition between the portioning cylinder 7 and a housing 10 of the portioning module 1.

The measuring pistons 8 can be manufactured from plastic.

In order for the measuring pistons 8 to be displaced from the measuring position into the ejecting position, use is made of a drive unit 11, which has a control component designed in the form of a control roller 12. The dough-portioning apparatus is designed such that the measuring pistons 8 are displaced from the ejecting position into the measuring position exclusively via a delivery pressure to which the measuring pistons 8 are subjected by the dough fed.

The control roller 12 has a longitudinal extent in a direction perpendicular to the drawing plane of FIGS. 1 and 2. The control roller 12 is connected to all the measuring pistons 8 in order for a tensile force to be transmitted from the control roller 12 to the measuring pistons 8.

The drive unit 11 also comprises at least one control curve 13, which interacts with the control roller 12. The control curve 13 is designed in two parts and interacts with opposite, free axial control sections of the control roller 12.

The respective measuring piston 8 is guided in the associated portioning chambers 5, that is to say on the lateral walls 6, via two axially spaced-apart guide surfaces 14, 15. Instead of a plurality of guide surfaces for guidance in the portioning chamber 5, the respective measuring piston 8 can also have precisely one guide surface.

The displacement movement of the measuring piston between the measuring position and the ejecting position is guided via a two-part guide fork 16. The control roller 12 runs in the guide fork 16. In the measuring position of the measuring pistons 8, the control roller 12, as illustrated in FIG. 2, is located in the vicinity of a free end of the guide fork 16.

When the dough is being portioned, the dough pressure which is produced by the dough being delivered from the delivery space 4 into the portioning chamber 5 ensures that the measuring pistons 8, which are first of all located in the ejecting position, are transferred, via the dough pressure, into the measuring position for example according to FIG. 2.

The respective measuring piston 8 is in pushing connection with the control roller 12 via a pressure-exerting surface 17. This pushing connection ensures that the control roller 12 is displaced into the measuring position in the region of the free end of the guide fork 16, said measuring position being illustrated in FIG. 2.

The pulling connection between the control roller 12 and all the measuring pistons 8 ensures that all the measuring pistons 8, as far as the relative positioning thereof within the respective portioning chamber 5 is concerned, assume precisely the same position, irrespective of how smoothly or sluggishly the guidance via the guide surfaces 14, 15 of the individual measuring pistons 8 takes place.

Once the measuring position has been reached, the portioning cylinder 7 is displaced out of the measuring-specific pivoting position in FIG. 2, in the anti-clockwise direction, into the ejecting-specific pivoting position. After the measuring position, the measuring pistons 8 are transferred with driving action via the drive unit 11, having the control roller 12 and the control curve 13, into the ejecting position. In this way, the portion of dough which until now has been in the portioning chamber 5 is transferred into a downstream processing unit of the dough-processing installation.

A rotation-prevention bar 18 (cf. FIGS. 3 to 7) is installed in a releasable manner on a rear wall 19 of the chamber housing 6a. The rotation-prevention bar 18 interacts with circumferential recesses 20 in the respective measuring pistons in order to prevent rotation of the measuring pistons 8. This prevents said measuring pistons from rotating in an undesired manner about their longitudinal axis. Parts of the rotation-prevention bar 18 butt against the circumferential recesses 20 of the measuring pistons 8.

Figure 5:
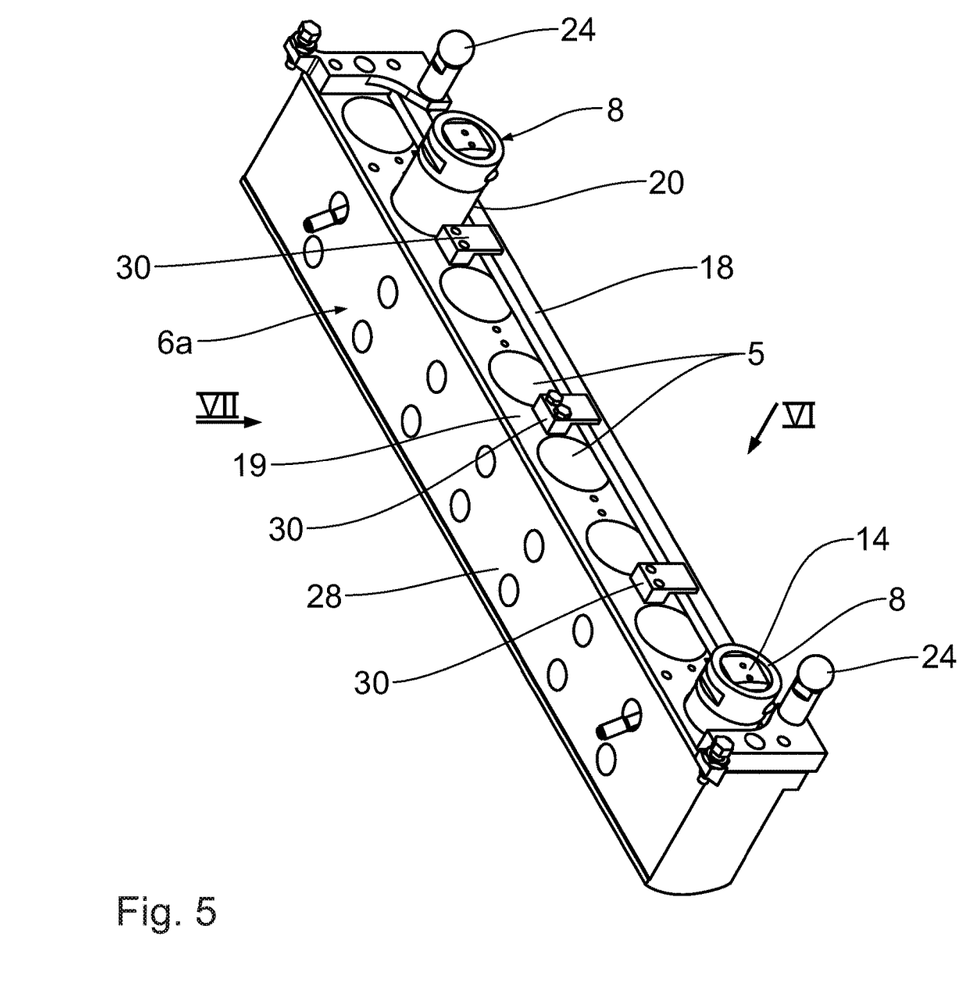
FIG. 5 shows, in perspective, a chamber housing of the dough-portioning apparatus, designed in the form of part of a pivotable portioning cylinder, wherein the rotation-prevention bar is shown in a position in which it is installed on the chamber housing.
Figure 6:
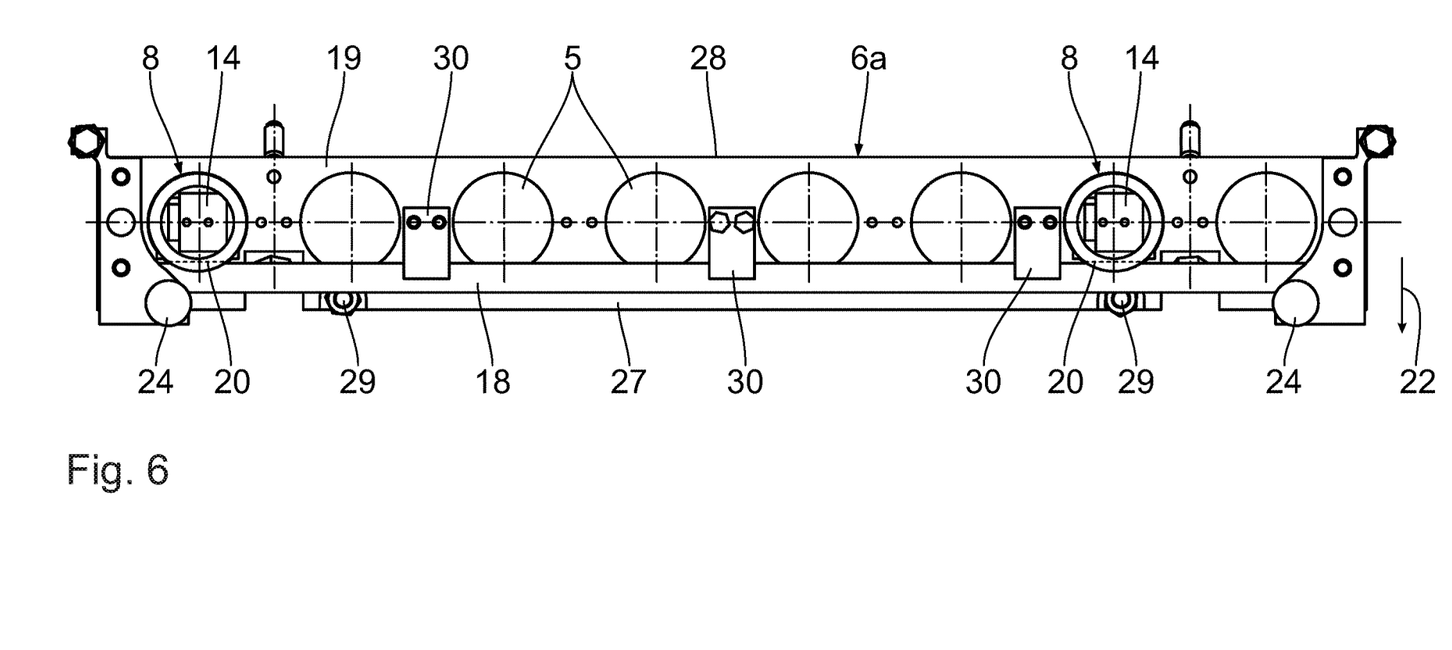
FIG. 6 shows a rear view of the chamber housing, as seen in viewing direction VI in FIG. 5.
Figure 7:
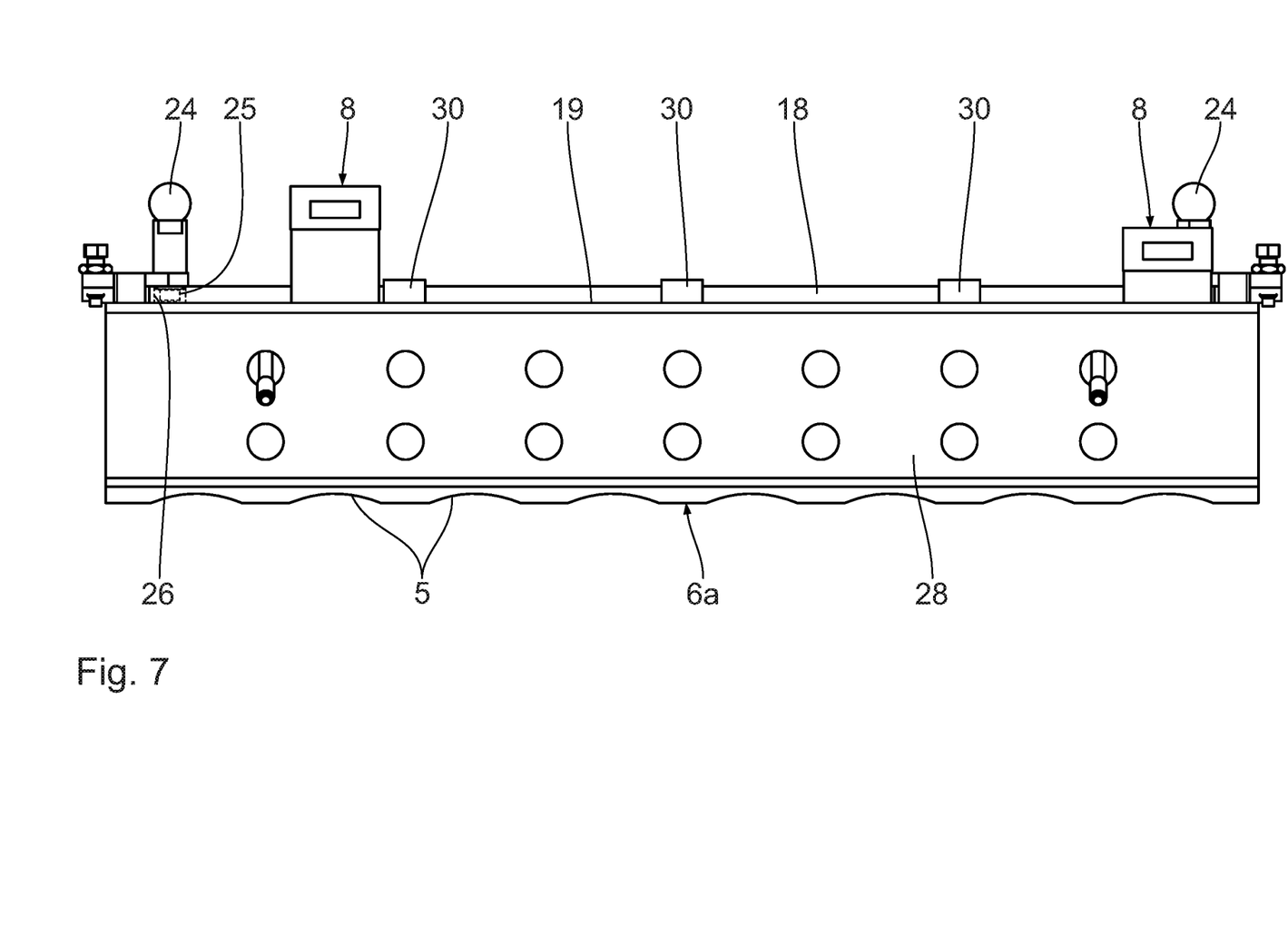
FIG. 7 shows a bottom view of the chamber housing, as seen in viewing direction VII in FIG. 5.

A cylinder-mounted part of the chamber housing 6a, said part not being illustrated in FIGS. 5 to 7, has a projecting section 21 (cf. FIG. 3), which projects beyond the rear housing wall 19 in the rearward direction, that is to say away from the portioning chambers 5.

The rotation-prevention bar 18 is installed on the chamber housing 6a such that, upon release, it can be removed from the chamber housing 6a in a removal direction 22 (cf. FIG. 3) perpendicular to the displacement direction 23 (cf. FIG. 2) of the measuring pistons 8. Said removal direction 22 is directed away from the projecting section 21 of the chamber housing 6a.

The rotation-prevention bar 18 is installed in the chamber housing 6a via two locking units 24 which can be actuated without any tools being required. As an alternative, it is also possible to provide a different number of such locking units for the installation of the rotation-prevention bar 18.

The respective locking unit 24 is designed in the form of a housing-mounted bolt 25 (cf. FIG. 7), which engages in a recess 26 in the rotation-prevention bar 18. The bolt 25 is prestressed via a spring of the locking unit 24, said spring not being visible in the drawing, into a locking position, which is illustrated in FIG. 7.

A section of the respective portioning chamber 5 is bounded by a bar-like measuring unit 27. The measuring unit 27 is installed on a main body 28 of the chamber housing 6a. A length of the portioning chambers 5 can be predetermined by adjustable displacement of the measuring unit 27 relative to the main body 28. The measuring unit 27 is in alignment with the rear housing wall 19. Installation elements 29 for predetermining the position of the measuring unit 27 on the main body 28 are arranged in a recessed manner in the measuring unit 27. Said installation elements 29, which are configured in the form of secured screws, therefore do not obstruct a removal movement of the rotation-prevention bar 18 in the removal direction 22.

Starting from the installed position of the rotation-prevention bar 18, which is illustrated for example in FIG. 5, the rotation-prevention bar 18 can be released from the chamber housing 6a by the respective actuating heads of the locking units 24 being subjected to pulling action, the bolts 25 therefore disengaging, counter to their prestressing spring force, from the recesses 26 in the rotation-prevention bar 18. With the two bolts 25 in the disengaged position, the rotation-prevention bar 18 can be removed from the chamber housing 6a in the removal direction 22.

Retaining chambers 30, which are each installed on the rear wall 19 of the chamber housing 6a, secure the rotation-prevention bar 18, in the installed position, against undesired displacement parallel to the displacement travel of the measuring pistons 8.

What is claimed is:

1. A multi-row dough-portioning apparatus
   having a chamber housing (6a),
   having a number of portioning chambers (5) for predetermining a portioned quantity of dough,
   having a number of measuring pistons (8), which can each be displaced in the portioning chambers (5) along a displacement direction (23)
      between a retracted, measuring position, in which the respective measuring piston (8) in the respective portioning chamber (5) predetermines a predetermined portioning volume,
      and a pushed-out, ejecting position,
   having a rotation-prevention bar (18), which is installed in a releasable manner on a rear housing wall (19) of the chamber housing (6a) and interacts with a circumferential recess (20) in the measuring pistons (8) in order to prevent rotation of the measuring pistons (8),
   wherein the chamber housing (6a) has a projecting section (21), which projects beyond the rear housing wall (19),
   wherein the rotation-prevention bar (18) is installed on the chamber housing (6a) such that, upon release, it can be removed from the chamber housing (6a) in a removal direction (22) perpendicular to the displacement direction (23) of the measuring pistons (8), and
   wherein the rotation-prevention bar (18) is installed on the chamber housing (6a) via at least one locking unit (24) which can be actuated without any tools being required.

2. The dough-portioning apparatus according to claim 1, wherein the locking unit (24) has a housing-mounted bolt (25), which engages in a recess (26) in the rotation-prevention bar (18).

3. The dough-portioning apparatus according to claim 2, wherein the bolt (25) is designed in the form of a spring bolt, which is prestressed into a locking position.

4. The dough-portioning apparatus according to claim 1, wherein the chamber housing (6a) is designed in the form of part of a portioning cylinder (7), which can be pivoted
   between a measuring-specific pivoting position, in which the measuring piston (8), in the measuring position, predetermines the predetermined portioning volume,
   and a pivoted ejecting-specific pivoting position, in which the measuring piston (8) can be displaced into the ejecting position in order to transfer a portion of dough to a downstream processing unit.

5. The dough-portioning apparatus according to claim 1, wherein at least one section of the respective portioning chamber (5) is bounded by a measuring unit (27), which is installed on a main body (28) of the chamber housing (6a).

6. The dough-portioning apparatus according to claim 5, wherein the measuring unit (27) is in alignment with the rear housing wall (19), wherein installation elements (29) for installing the measuring unit (27) on the main body (28) are arranged in a recessed manner in the measuring unit (27).

7. The dough-portioning apparatus according to claim 1, comprising a multi-row embodiment with a corresponding number of portioning chambers (5) and measuring pistons (8).

8. A dough-processing installation having a dough-portioning apparatus
   having a chamber housing (6a),
   having a number of portioning chambers (5) for predetermining a portioned quantity of dough,
   having a number of measuring pistons (8), which can each be displaced in the portioning chambers (5) along a displacement direction (23)
      between a retracted, measuring position, in which the respective measuring piston (8) in the respective portioning chamber (5) predetermines a predetermined portioning volume,
      and a pushed-out, ejecting position,
   having a rotation-prevention bar (18), which is installed in a releasable manner on a rear wall (19) of the chamber housing (6a) and interacts with a circumferential recess (20) in the measuring pistons (8) in order to prevent rotation of the measuring pistons (8), wherein the chamber housing (6a) has a projecting section (21), which projects beyond the rear housing wall (19), wherein the rotation-prevention bar (18) is installed on the chamber housing (6a) such that, upon release, it can be removed from the chamber housing (6a) in a removal direction (22) perpendicular to the displacement direction (23) of the measuring pistons (8), wherein the rotation-prevention bar (18) is installed on the chamber housing (6a) via at least one locking unit (24) which can be actuated without any tools being required, and wherein the locking unit (24) has a housing-mounted bolt (25), which engages in a recess (26) in the rotation-prevention bar (18).

* * * * *